United States Patent Office 3,446,576
Patented May 27, 1969

3,446,576
PROCESS FOR PURIFICATION OF YTTERBIUM
Paul A. Rombau, La Rochelle, France, assignor to Produits Chimiques Pechiney-Saint-Gobain, Neuilly-sur-Seine, France
No Drawing. Filed June 12, 1967, Ser. No. 645,495
Claims priority, application France, June 13, 1966, 65,209
Int. Cl. C01g 17/00, 1/00
U.S. Cl. 23—22                                    7 Claims

ABSTRACT OF THE DISCLOSURE

The process of separation of ytterbium from others of the rare earth metals such as thulium and lutecium by reaction of the rare earth metal compounds in a trivalent state with a samarium compound in the bivalent state in an alkaline medium whereby the trivalent ytterbium is reduced to a soluble bivalent compound while others of the rare earth compounds remain insoluble in the alkaline medium and oxidizing the separated solution of the ytterbium compound to reconvert the compound of ytterbium to a trivalent state while the residue containing the insoluble compounds of thulium and lutecium can be separated by conventional techniques.

---

This invention relates to the separation of ytterbium in a state of high purity and it relates more particularly to separation of ytterbium from others of the rare earth metals.

Because of the uniform and slight differences in the properties of rare earth metals, the known or classical methods for separation lead primarily to the enrichment of the metals as distinguished from their separation. Purification, which can be effected by the process of fractionation, is subject to objections because of the long time and the large number of operations required. The more recent methods, such as by ion exchange or solvent separation, are extremely slow, particularly in the separation of closely related elements such as ytterbium, thulium and lutecium in which it is desirable to obtain ytterbium in a high degree of purity for use in a number of new technological applications.

Some of the rare earth metals are capable of valencies other than their normal valency of III whereby use can be made of such changes in valency to effect separation. Conversion of cerium to a valency of IV enables easy separation thereof from ytterbium, europium and samarium which are capable of change to a valency of II in some compounds with properties similar to those of the alkaline earth metals. This unusual behavior has permitted the development of a process for separation of these metals in a bivalent state, either by treatment in solution in an alkaline medium or by precipitation as the sulphate, as described in French Patent No. 1,209,251, filed July 11, 1958.

The stability of samarium in its bivalent state is fairly low. This condition has been employed by the inventor for conversion of europium from its trivalent to its bivalent state for separation of europium as an insoluble sulphate while the bivalent samarium is recovered in its trivalent state, as described in application Ser. No. 609,296, filed January 16, 1967, and entitled "Process for Extracting and Concentrating Europium."

It has now been found, in accordance with the practice of this invention, that ytterbium can be separated in a high state of purity by reaction with bivalent samarium to convert the ytterbium to a compound in the bivalent state whereby it can be effectively separated from mixtures of compounds of thulium and lutecium.

In accordance with a preferred practice of this invention, the rare earth metals, in the form of their hydroxides, are treated with a bivalent samarium compound in a non-oxidizing alkaline solution whereby ytterbium is converted into a soluble state for solution, while others of the rare earth metal compounds remain in the insoluble state.

It will be understood that the concepts of this invention not only comprise obtaining ytterbium compounds in a high state of purity but it also includes the further separation, in a purified state, of others of the rare earth metals normally present with ytterbium. This is particularly true with respect to thulium and lutecium which are closest to ytterbium in the series and which can be easily separated one from the other by the methods of fractionation, especially after ytterbium has been removed.

Numerous methods are available for the preparation of compounds in which samarium is present in the bivalent state. Because of the low stability of the bivalent samarium compounds in solution, it is preferred to obtain the bivalent metal compound by reduction of trivalent samarium compounds at relatively high temperature with a metal such as calcium, preferably in admixture with salts of other alkaline earth metal compounds. A fusible mass is obtained which can be easily crushed for use.

The following example is given by way of illustration, but not by way of limitation, of the practice of this invention:

A mixture of rare earth oxides formed of 25% lutecium, 73% ytterbium and 2% thulium is dissolved in 20 liters of hydrochloric acid containing 10 grams HCl per liter. 10 moles of ammonium hydroxide in solution is added to give a highly alkaline medium in which the rare earths are precipitated as their corresponding hydroxides.

In a separate electric furnace, heated to a temperature of 750° C., a mixture of equal parts by weight of barium chloride, calcium chloride and the chloride of rare earth metals in the trivalent state, approximately 50% by weight of which is samarium, is melted with an excess of calcium added to reduce the samarium to its bivalent state. The molten mass is cooled and crushed and an amount corresponding to 300 grams of samarium chloride is added to the previously formed suspension of the rare earth hydroxides. Only ytterbium hydroxide is reduced and taken in solution in the alkaline medium. The solids are separated from the solution by filtration to provide a solute containing the compound of ytterbium, excess samarium compound and a small quantity of europium compound, which may be present, while the separated precipitate contains the compounds of lutecium and thulium which are not taken into solution.

The solution is oxidized with 50 cm.$^3$ of nitric acid. This is insufficient to convert the alkaline solution to the acid side but it operates to reconvert the metals to their trivalent state in the form of insoluble hydroxides which, when separated and analyzed spectographically, shows thulium and lutecium present in amounts less than 10 p.p.m.

The soluble hydroxides of lutecium and thulium can be treated separately by conventional ion exchange procedures using ion exchange resins for extraction of the separate elements. This becomes easy after the high factor of separation between the different elements of each group, which leaves components which are sufficiently distant one from the other in the rare earth series to enable separation by conventional means. This is represented by the described separation of ytterbium from thulium and lutecium, leaving the latter which are sufficiently spaced in the rare earth series to enable effective separation by ion exchange means or the like.

The bivalent samarium salts are unstable such that use as a crushed solid mass enables it to act substantially instantaneously without useless oxidation. It will be understood that other processes may be employed for reduction of the trivalent samarium compounds for use in the process of this invention, such as by electrolysis of fused baths, sodium reduction, where use can be made of separately prepared dark violet solutions of samarium chloride which, while highly unstable, can be employed in the absence of oxidizing conditions, such as by the addition to the suspension of ytterbium hydroxide under vacuum conditions.

It will be understood that usage of the term "metals" in the previous description has reference to the metals in compound form such as their salts and the like.

It will be understood that invention also resides in the purified ytterbium produced by the process of this invention and that changes may be made in the details of formulation and operation without departing from the spirit of the invention, especially as defined in the following claims.

I claim:

1. In the process for the separation of ytterbium from thulium and lutecium in the form of their corresponding compounds comprising the steps of reacting the hydroxides of the metals in their trivalent state with a compound of samarium in the bivalent state in a non-oxidizing aqueoue alkaline medium whereby ytterbium is reduced to a soluble compound in the bivalent state while the compounds of thulium and lutecium remain insoluble, and separating the soluble phase containing the bivalent compound of ytterbium from the phase containing the insoluble compounds of thulium and lutecium.

2. The process as claimed in claim 1 which includes the step of oxidizing the separated solution for reconversion of the compound of ytterbium to the normal trivalent state.

3. The process as claimed in claim 2 in which the oxidation step is effected by adding nitric acid to the solution in an amount insufficient to convert the alkaline solution to an acidic state.

4. The process as claimed in claim 1 in which the ytterbium, lutecium and thulium are present as the oxide and which includes the steps of dissolving the oxides in an acid solution and the addition of ammonium hydroxide in an amount to convert the solution to an alkaline medium in which the metals in their trivalent state are converted to their corresponding insoluble hydroxides.

5. The process as claimed in claim 1 in which the bivalent samarium compound is provided by reduction of trivalent samarium chloride with calcium.

6. The process as claimed in claim 1 in which the bivalent samarium compound is provided by reduction of a trivalent samarium compound with sodium.

7. The process as claimed in claim 1 in which the bivalent samarium compound is provided by reduction of trivalent samarium compound by electrolysis in a fused bath.

References Cited

UNITED STATES PATENTS

| 3,077,378 | 2/1963 | Peppard et al. | 23—23 |
| 3,092,449 | 6/1963 | Bril et al. | 23—22 |
| 3,153,571 | 10/1964 | Bronaugh | 23—22 |

FOREIGN PATENTS

| 902,753 | 8/1962 | Great Britain. |

OTHER REFERENCES

Spedding et al., "The Rare Earths," John Wiley & Sons, New York, 1961, page 23.

Topp, "The Chemistry of the Rare Earth Elements," Elsevier Publishing Co., New York, 1965, pp. 26–28.

H. T. CARTER, *Primary Examiner.*

U.S. Cl. X.R.

23—23, 24, 183